3,308,884
PLUGGING UNDERGROUND FORMATIONS
Thomas J. Robichaux, Houston, Tex., assignor to Shell Oil Company, New York, N.Y., a corporation of Delaware
Filed Dec. 13, 1963, Ser. No. 330,351
1 Claim. (Cl. 166—33)

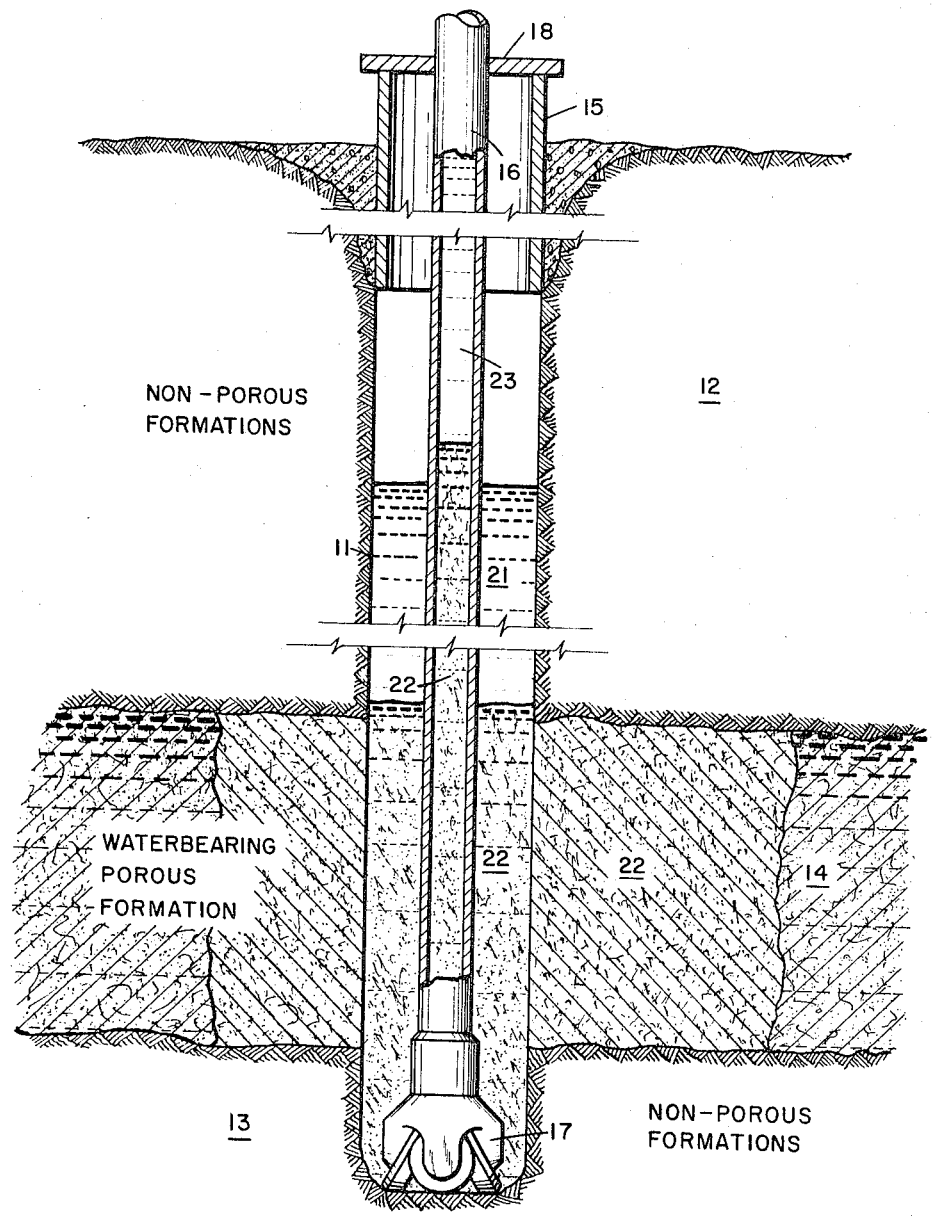

This invention relates to methods for plugging the pores of porous earth formations and for converting unconsolidated porous sands into non-porous consolidated formations. More particularly, this invention is directed to an improved method for plugging water-bearing earth formations penetrated by a borehole or mine shaft.

The need for simple, practical and economical methods of plugging the pores of porous underground formations is widely recognized and numerous methods have been suggested for accomplishing the purpose. The need arises, for example, in the drilling of oil wells, particularly in air drilling methods in which water entering the borehole from water-bearing formations interferes with the drilling. The need is also apparent in some mining operations, such as in the digging of mine shafts through water-bearing strata, particularly unconsolidated sands, to reach lower deposits.

Use of various types of organic resins has heretofore been suggested for plugging porous underground formations. The methods heretofore suggested generally have the disadvantage that the zone to be plugged must be pretreated in some fashion, so that a multiple number of injections of chemicals in sequence is required in the plugging operation. Another disadvantage of resins heretofore employed, such as phenol-formaldehyde and urea-formaldehyde types, is that they cannot be practically employed at relatively high temperatures often encountered in underground formations since they react too rapidly at temperatures above about 140° F. Another disadvantage of resins heretofore used is that many are sensitive to the chemical composition of the formation and cannot be used in some types of formation, e.g., in acidic or basic formations. A further disadvantage of at least some of the resins heretofore employed is that solutions to be pumped into the formation are so viscous that it is difficult to cause them to penetrate to a desired depth into a formation of moderate porosity. A disadvantage of some plugging media heretofore used is that they remain relatively soft and can be squeezed out of the formation, e.g., by water pressure.

It is an object of this invention to provide an improved method for plugging and, if necessary, simultaneously consolidating, porous underground formations; the method of this invention overcomes the above-mentioned disadvantages. It is a specific object to provide an improved method for plugging water-bearing porous formations surrounding a borehole. Another object is to provide a method for plugging underground formations having relatively high temperaturs, such as 300° F. and higher.

These and other objects of this invention will be understood from the following description, taken with reference to the attached drawing wherein the sole figure is a schematic representation of a borehole in which this invention is being practiced.

The method for plugging the pores of a porous underground formation according to this invention comprises the steps of (a) preparing a solution of a resin-forming epoxide having more than one vicinal epoxy group per molecule and an amine capable of acting as curing agent for said epoxide, and, optionally, a cure rate controlling compound, the resin-forming ingredients being present in a combined concentration of at least 20 percent by volume of said solution, and being selected to provide a system which remains a homogeneous solution of relatively low viscosity for a substantial period of time, sufficient to inject said solution into said formation, (b) injecting the solution into the pore space of a permeable formation to be treated, and (c) retaining the solution in the formation for a sufficient time to permit the solution to be converted to a gel which completely fills the pore space of the mass and to cure to a coherent, cross-linked resin mass.

The composition of the solution is selected such that the (a) resin-forming ingredients and partial reaction products remain dissolved until the solution has entered the formation to be plugged and thereafter react to form a gel which incorporates the solvent, and (b) the solution has a viscosity which is sufficiently low to permit it to be pumped into the formation in a reasonable length of time with available equipment.

The viscosity is usually selected to be below 100 centipoises at formation temperature.

The total amount of resin-forming ingredients, i.e., resin-forming polyepoxide, amine curing agent and cure modifying compound, is between 20 and 60 percent by volume of the solution, the remainder being hydrocarbon solvent. A preferred concentration range is between 30 and 45 percent.

One of the advantages of this invention over various methods known to the prior art is that all the ingredients required for plugging the formation are present in a single solution and that the solution may be directly injected into a water-bearing formation without any prior treatment of the formation. Another advantage is that solutions according to this invention may be prepared which can be successfully employed in plugging any usual type of formation at temperatures as low as 70° F. or less and as high as 300° F. and higher. Another advantage is that the cured resin is capable of remaining immobile in and plugging formations under high pressure differentials such, for example, as 7000 p.s.i. or more between the formation and the borehole.

Another advantage is provided by the adjustability of the gelling time which can be obtained from a single hydrocarbon solvent, a single resin-forming polyepoxide composition and a single curing agent composition by merely varying the proportion of cure rate modifying compound. Since in different wells encountered in commercial drilling the gelling time required will vary depending on the depth, temperature, porosity and permeability of the formation to be treated, the present invention provides a high degree of flexibility without requiring a variety of different ingredients for obtaining such flexibility.

Low viscosity solutions according to this invention are adapted to plugging of water producing zones of relatively low porosity which cannot be plugged by formulations heretofore known, which have higher viscosities.

COMPONENTS USED IN THE TREATING PROCESS

*Solvents*

The solvents which can be used in the process of this invention are liquid hydrocarbon compositions containing at least 90% by volume of aromatic hydrocarbons; it is preferred to employ as solvents liquids consisting completely of aromatic hydrocarbons. A particularly preferred solvent is toluene, which is relatively inexpensive and readily available and which is advantageous because of its relatively low viscosity. However, other aromatic hydrocarbons or hydrocarbon mixtures may be employed, e.g., benzene, xylenes, and commercial aromatic hydrocarbon concentrates, provided only that they are liquid at the ambient temperatures encountered in the area where the process is to be employed, and at formation conditions. Up to 10% by volume of the total solvent may be paraffinic or naphthenic hydrocarbons, e.g., in the gasoline, kerosene, or diesel oil boiling range.

Resin-forming epoxides

The epoxides used in the process of this invention comprise those organic materials possessing more than one vic-epoxy group, i.e., more than one

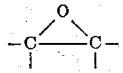

group. These materials may be saturated or unsaturated, aliphatic, cycloaliphatic, aromatic or heterocyclic. They are referred to herein as resin-forming epoxides or as polyepoxides. In the art, even the uncured materials are often referred to as epoxy resins.

The polyepoxides can be described in terms of epoxy equivalent value, which refers to the number of epoxy groups contained in the average molecule. The meaning of this expression is described in U. S. 2,633,458.

If the polyepoxide consists of a single compound and all of the epoxy groups are intact, the epoxy equivalency will be integers, such as 2, 3, 4 and the like. However, in the case of polymeric type polyepoxides many of the materials may contain some of the monomeric monoepoxides or have some of their epoxy groups hydrated or otherwise reacted and/or contain macromolecules of somewhat different molecular weight so that epoxy equivalent values may be quite low and contain fractional values. The polymeric material, may, for example, have epoxy equivalent values, such as 1.4, 1.8, 2.5 and the like.

Examples of the polyepoxides include, among others, 1,4 - bis(2,3-epoxypropoxy)benzene, 1,3 - bis(2,3-epoxypropoxy)benzene, 1,4' - bis(2,3 - epoxypropoxy)diphenyl ether, 1,8 - bis(2,3 - epoxypropoxy)octane, 1,4 - bis(2,3-epoxypropoxy)cyclohexane, 4,4' - bis(2 - methoxy - 3,4-epoxybutoxy)diphenyl dimethylmethane, 1,3 - bis(4,5-epoxypentoxy) - 5 - chlorobenzene, 1,4 - bis(3,4 - epoxybutoxy)benzene, and 1,4 - bis(2 - methoxy - 4,5 - epoxypentoxy)benzene.

Polyepoxides suitable for conversion to cured epoxy resins are well-known materials of commerce. Many are described in the book "Epoxy Resins" by Lee and Neville, McGraw-Hill, New York, 1957.

Examples of such polyepoxides are the epoxy polyethers of polyhydric phenols obtained by reacting a polyhydric phenol with a halogen-containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2-bis(4-hydroxyphenyl)propane (Bisphenol A), 2,2 - bis(4 - hydroxyphenyl)butane, 4,4' - dihydroxybenzophenone, bis(4 - hydroxyphenyl)ethane, 2,2 - bis(4 - hydroxyphenyl)pentane, and 1,5 - dihydroxynaphthalene. The halogen-containing epoxides may be further exemplified by 3-chloro-1,2-epoxybutane, 3-bromo-1,2-epoxyhexane, 3-chloro-1,2-epoxyoctane, and the like.

The monomer products produced by this method from dihydric phenols and epichlorohydrin may be represented by the general formula

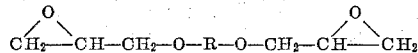

wherein R represents a divalent hydrocarbon radical of the dihydric phenol. The polymeric products will generally not be a single simple molecule but will be a complex mixture of glycidyl polyethers of the general formula

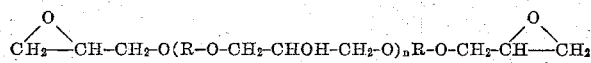

wherein R is a divalent hydrocarbon radical of the dihydric phenol and $n$ is an integer of the series 0, 1, 2, 3, etc. While for any single molecule of the polyether $n$ is an integer, the fact that the obtained polyether is a mixture of compounds causes the determined value for $n$ to be an average which is not necessarily zero or a whole number as noted above.

The afore-described preferred glycidyl polyethers of the dihydric phenols may be prepared in known manner by reacting the required proportions of the dihydric phenol and the epichlorohydrin in an alkaline medium. The desired alkalinity is obtained by adding basic substances, such as sodium or potassium hydroxide, preferably in stoichiometric excess, to the epichlorohydrin. The reaction is preferably accomplished at temperatures within the range of from 50° C. to 150° C. The heating is continued for several hours to effect the reaction and the product is then washed free of salt and base.

Preferred members of the above-described group of polyepoxides are the glycidyl polyethers of the dihydric phenols, and especially of 2,2-bis(4-hydroxyphenyl)propane, having an epoxy equivalency between 1.0 and 2.1, preferably at least 1.4, a molecular weight between 250 and 900, and a Durrans Mercury Method softening point preferably no greater than 30° C. Most preferred are the normally liquid products having a molecular weight of about 350 to 400 and an epoxy equivalent of about 1.75 to 2.1, typically 1.85, which may be prepared as described under the heading "Polyether A" in U. S. 2,633,458.

The glycidyl polyethers of polyhydric phenols obtained by condensing the polyhydric phenols with epichlorohydrin as described above are also referred to as "ethoxyline" resins. See Chemical Week, vol. 69, page 27, for September 8, 1951.

Another group of polyepoxides that may be used comprises the glycidyl ethers of novolak resins, which resins are obtained by condensing an aldehyde with a polyhydric phenol. A typical member of this class is the epoxy resins from formaldehyde 2,2-bis(4-hydroxyphenyl)propane novolak resin.

Amine curing agents

Especially preferred for use as curing agents in this invention are the polyamines possessing one or more 6-membered carbocyclic ring, i.e., cycloaliphatic or aromatic rings. These include 1-cyclohexylamino-3-aminopropane, 1,4-diaminocyclohexane, 1,3-diaminocyclopentane, bis(3-methyl-4-aminocyclohexyl)methane, bis(4 - aminocyclohexyl)methane, di(aminocyclohexyl)sulfone, 1,3 - di-(aminocyclohexyl)propane, 4-isopropyl-1,2-diaminocyclohexane, 2,4-diaminocyclohexane, N,N'-diethyl-1,4-diaminocyclohexane, and the like. Preferred members of this group comprise those polyamines having at least one amino or alkyl-substituted amino group attached directly to a cycloaliphatic ring containiing from 5 to 7 carbon atoms, and most preferably six carbon atoms. Especially suitable are hydrogenated primary and secondary aromatic polyamines having at least two amino hydrogens, at least 50% of their aromatic structure having been converted to cycloaliphatic structure during hydrogenation. These cycloaliphatic amines are suitably obtained by hydrogenating the corresponding aromatic amine. Thus di(aminocyclohexyl)methane is obtained by hydrogenating methylene dianiline. Use of these amines is described in further detail in U.S. 2,817,644 to Shokal et al., the pertinent disclosures of which are incorporated herein by reference. These amines are especially preferred because they react rather slowly with the preferred epoxides in hydrocarbon solution, and thus provide ample time for the solution to be pumped into the earth formation to be treated, even in deep wells and those most resistant to injection of fluid. As explained hereafter, in more detail, the time of first precipitation of resin from solution of such amines with polyepoxides can be shortened to a desired extent by addition of cure accelerators.

Suitable for use particularly at relatively high temperatures are the aromatic polyamines, such as 1,3-diaminobenzene, 1,4 - diaminobenzene, 4,4' - diaminodiphenyl, 1-phenylamino-3-aminopropane, di-2-aminophenyl methane, di-4-aminophenyl methane, di-3-methyl-4-aminophenyl methane and di-4-aminophenyl sulfone.

Various other amine curing agents which impart similar properties to the solution may be employed.

The amine curing agent is preferably employed in at least 5% molar excess over the amount stoichiometrically required to react with all the epoxide groups of the uncured polyepoxide.

Cure rate modifiers

Among the amines suitable for use in the process of this invention, compounds can probably be found which would result, with suitable adjustment of other variables, in any desired time interval between preparation of the mixture and gelling of the solution. However, it is generally advantageous to use only a limited number of amine curing agents and to vary the time interval between mixing and gelling of the solution by using an appropriate amount of a cure rate modifying compound. The rate of the curing reaction between polyepoxides and the above-described cycloaliphatic amines in aromatic hydrocarbon solution is usually undesirably slow; this would necessitate an excessively long period during which the ungelled solution must be held in the formation being treated by applying pressure to counter the formation pressure, and would delay further drilling operations. It is therefore generally advantageous to vary the time between mixing and gelling of the solution by using an appropriate amount of an appropriate cure accelerator or promoter. The use of promoters to accelerate the curing reaction between polyepoxides and amines is known. Among the preferred cure accelerators are phenolic compounds and tertiary amines. A particularly preferred compound is phenol itself. Another suitable accelerator is tri-dimethylaminomethylphenol. Other phenolic compounds, e.g., alkyl-substituted phenols, dihydric benzenes and the like may also be used. For a reaction mixture of a given polyepoxide with a given curing agent, the amount of cure accelerator can be selected to provide a desired interval between mixing and gelling of the solution.

In some cases it may be desirable to include a cure retardant rather than a cure accelerator in the resin-forming composition. Retardants for the reaction of polyepoxides with amine curing agents are known. Suitable for such use are, for example, ketones, e.g., acetone, and aldehydes, e.g., cyclohexanone.

ILLUSTRATIVE EXAMPLES

In the following examples, unless otherwise stated, the epoxy compound is of the type prepared from 2,2-bis(4-hydroxyphenyl)propane and epichlorohydrin as described in U.S. 2,633,458 under the heading "Polyether A"; it has an epoxy value of about 0.54 eq./100 g., an epoxide equivalent of about 1.85, an average molecular weight of about 380, and a viscosity, at 25° C., in the range from 100 to 160 poises.

The curing agent unless otherwise stated is bis(3-methyl-4-aminocyclohexyl)methane.

A series of resin solutions were prepared by dissolving the above-identified epoxy compound and curing agent in solvents containing different proportions of toluene and paraffinic diesel oil. Some of the solutions were prepared with and some without phenol cure accelerator. The solutions were permitted to stand for 16 hours at 140° F. Thereafter the volume of resin gel formed in the total solution was visually observed. The results are shown in Table 1. The data illustrate: (1) the accelerating effect of phenol on the setting of the solution into a resin gel; (2) the necessity of employing a solution containing at least about 20 percent of resin-forming compounds; (3) the necessity of providing a solvent consisting at least to the extent of 90% of aromatic hydrocarbons; and (4) the advantage of employing a 100% aromatic solvent and a cure accelerator to permit gelling within a commercially practical period of time.

TABLE
[Volume of set resin visually estimated]

| Solution | | Gel | |
|---|---|---|---|
| Solvent | Resin Components, Vol. Percent | Phenol, g./l. | |
| | | 0.0 | 6.0 |
| Toluene, 100% | 37½ | 100% set | 100% set. |
| Do | 20 | No solids | 100% set. |
| Do | 18 | No solids | 10% set. |
| Toluene, 90 / Gas Oil, 10 | 37½ | 80% set | 100% set. |
| Gas Oil, 10 | 20 | 60% set | 60% set. |
| Gas Oil, 10 | 18 | No solids | 25% set. |

The data further illustrate that solvent composition, concentration of resin-forming ingredients, and reaction conditions are to some extent interchangeable variables.

Further studies were carried out with a solution of 37½% resin components in toluene solvent, together with 6 g./l. of phenol. Two vuggy limestone cores, 2½ inches long by 1 inch in diameter, were saturated with brine and then slightly over one pore volume of resin-forming solution allowed to flow into the core. The core was held at 140° F. Residual permeability was measured after 16 hours at 900 p.s.i. differential pressure. In one core the permeability was reduced from 21.8 md. to 0.4 md.; in the other core the permeability was reduced from 262 md. to 0.0 md.

In another test a vuggy limestone core was saturated with brine. Thereafter slightly over one pore volume of a solution of 25 parts by weight of epoxy compound, 12½ parts by weight of curing agent and 10 g./l. of phenol, dissolved in toluene, was forced into the core with no preflush. The core was allowed to stand at 140° F. overnight. Subsequently, one-fourth inch of both faces of the core was cut away, and permeability determined. Before treatment the permeability of the core to water was 70 md. and after treatment 0.0 md. A pressure of 1000 p.s.i was maintained across the core for eight hours with no fluid movement.

Similarly good plugging is obtained with solutions containing instead of the above-defined amine a slight stoichiometric excess of 1-cyclohexylamino-3-aminopropane or a 50:50 mixture of bis(4-aminocyclohexyl)methane and 1-cyclohexylamino-3-aminopropane. These curing agents are faster-acting, and hence suitable for use at relatively lower formation temperatures. Still faster acting curing agents which can be substituted are, for example, n-aminoethyl-piperazine or propylene diamine.

Similarly good plugging is also obtained by substituting for the above-identified polyepoxide mixture other similar liquid polyepoxides, or, for example, essentially pure diglycidyl ether of 2,2-bis(4-hydroxyphenyl)propane. Concentrations between 30 and 40% by volume are generally preferred. The upper concentration limit is set either by economic considerations, balancing greater gel strength against use of unnecessarily large amounts of resin, or by excessive solution viscosity. The curing conditions are dictated by the formations to be plugged. The time required to initiate gel formation and that to produce gel of desired consistency vary in inverse relationship with curing temperature and with concentration of ingredients in the solution. By selection of appropriate epoxy compounds, curing agents and cure rate modifying compounds, it is possible to provide adequate plugging of formation under most, if not all, conditions encountered in the field.

A preferred method of practicing the present invention in plugging a porous underground formation will now be described by way of example.

In a borehole in which a porous formation, such as a water-carrying limestone, is to be plugged, the formation conditions such as temperature and porosity of the formation are measured. Samples of the formation may be taken for the purpose of measuring porosity and permeability.

From the pump capacity and the depth of the borehole as well as the porosity and permeability of the formation, the minimum required initial resin separation time is calculated. This is at least a sufficient length of time to permit the required amount of solution to be pumped into the formation.

From laboratory test results such as those illustrated above, the required percentages of the epoxy compound, curing agent, cure accelerator if used, and solvent are determined which give a sufficient time between mixing and gelling to permit pumping the solution down into the formation without encountering gelling.

The required proportions of epoxy compound, curing agent, solvent, and promoter if used, are then mixed. The promoter should be mixed with the hydrocarbon solution of epoxy compound and curing agent just before the solution is pumped into the borehole. The complete hydrocarbon solution is then pumped into the well and into the formation by any suitable known method, as hereafter described in further detail. After the required amount of resin-forming solution has been forced into the formation the well is shut in and pressure is maintained to permit the solution to remain undisturbed in the formation until it has had time to gel and cure. After the resin gel is sufficiently cured to withstand the pressure differential between the formation pressure and atmospheric pressure the drilling operation can be resumed.

The method of this invention is further illustrated by reference to the drawing, in which the sole figure illustrates one perferred method of carrying out the invention.

In the drawing a well borehole 11 is shown which has been drilled through various strata, including non-porous formations 12 and 13 and a porous water bearing formation 14. A well casing 15 is shown cemented in the upper portion of the well ending in non-porous formation 12. A drill string 16 is placed in the well, terminating in drill bit 17. The well is capped as indicated schematically by cap 18.

After the required preparations have been made as described, water is introduced into the well through tubing 16 until pumping pressures indicate that the water column in the borehole is remaining substantially static and water is entering the formation 14. The prepared resin-forming solution is then pumped into the well and enters the formation. The drawing illustrates that stage of the operation at which a head of water, 21, is in the borehole, resin-forming solution 22 has entered the formation and some is still in the borehole and in the drill string. A displacing fluid, 23, such as crude oil, or a gel plug followed by a displacing fluid, is in the drill string above the resin-forming solution.

After the desired amount of resin-forming solution has been introduced into the formation, the drill string is raised above the level of resin solution in the well, and the well is kept shut in until the resin solution has set up into a solid gel and cured to sufficient hardness to withstand the formation pressure. The remaining resin plug in the borehole can then be drilled out, and further drilling of the well resumed.

The method illustrated in the drawing is particularly advantageous, for example, in air drilling of wells in which water-bearing formations are encountered at great depth and consequently high temperatures, e.g., at well hole temperatures as high as 300° F. In such a well a toluene solution of 25% epoxy compound and 12½% curing agent of the type described above would have a gelling time of less than one hour, which would generally be insufficient for pumping the solution into the formation. A suitable solution for such a well contains 20% resin and 10% curing agent. The gelling time for this solution, without accelerator, is about 1¼ hours at 300° F. This provides sufficient time to place the solution into a formation in a well drilled on a commercial scale.

It will be readily apparent that numerous other methods for introducing the required solution into the desired earth formation can be applied. For example, it is sometimes desirable to seal off the borehole just above the formation to be treated by means of a packer positioned around the drill string. In other cases it may be desirable to employ a straddle packer to seal off both the upper and the lower end of the formation to be treated, or to seal off a portion of the formation to be treated and thereafter move the packers to treat a further portion of the formation. When only a small portion of formation is to be treated a special tool may be employed in which the hydrocarbon solution is contained in a compartment of the tool. The tool is lowered on a wire line to the desired depth. The casing, if any, and formation are penetrated if necessary, the solution is forced from the tool into the formation and the well is shut in for the time required for the resin to gel and harden. This system permits use of faster acting curing agents than in the case where solutions are pumped into the well. Still other methods of injecting the desired treating solution into the formation to be treated will occur to the persons skilled in the art.

The method of this invention can also be employed, for example, in the suppression of water coning or gas coning in a producing oil well, due to flow of water or gas, respectively, into the producing formation. In plugging the formations at the interface of the oil-bearing and the water- or gas-bearing formation it is desirable to inject the resin solution such as to form a relatively flat disc having its hub at the borehole. This may be accomplished by the method described and claimed in U.S. Patent 2,784,787.

The method of this invention may be employed in the consolidation of earth through which it is desired to dig a mine shaft. A suitable mode involves the drilling of a number of boreholes spaced at regular intervals along the circumference of the proposed shaft. Where the boreholes penetrate water-bearing formations, such as limestones or unconsolidated sands, the above-described method is followed in each borehole to force a sufficient amount of resin into the formation which it is desired to plug to penetrate the formation and form a continuous resin mass between adjacent boreholes. This can be done by forcing resin solution into the formation from each of the adjacent boreholes or by forcing resin solution into the formation from one borehole and withdrawing fluid from an adjacent one until a significant amount of resin solution is being produced from the adjacent borehole. By carrying out this procedure until a continuous resin block is formed between all the adjacent boreholes around the circumference of the proposed shaft, a barrier is formed which consolidates unconsolidated formations and plugs water-bearing formations in such a manner that thereafter a mine shaft may be readily dug in the conventional manner. In the past it has been necessary, where mine shafts were to be dug through unconsolidated water-bearing formations, to freeze the formations surrounding the mine shaft during the digging operation. A substantial danger in this method was that, after the shaft had been completed and the surrounding formations permitted to thaw, sufficient pressure could be developed to cave in the shaft. The utilization of the present method of consolidation obviates such danger.

Other methods of utilizing the method of formation plugging according to this invention may be carried out within the scope of the invention, which is defined by the attached claim.

I claim as my invention:

A method for plugging a water-bearing porous formation encountered in air-drilling of a borehole by forming a gel in the pores of the formation which renders the formation non-porous which comprises the steps of (a) preparing a solution of resin and amine which maintains a viscosity below 100 centipoises at least until it enters said formation, said solution consisting of
(1) 55 to 70 parts by volume of toluene,
(2) 30 to 45 parts by volume of the following resin-forming components:
  (i) a mixture of liquid glycidyl ethers of 2,2-bis(4-hydroxyphenyl)propane having an epoxy equivalency of about 1.75 to 2.1 and a molecular weight of about 350 to 400,
  (ii) bis(3-methyl-4-aminocyclohexyl)methane, and
  (iii) phenol
the composition of the solution being predetermined to maintain the reaction product of said epoxide and amine in solution for the time required to inject said solution into said formation, and thereafter to be converted completely to a gelled resin,
(b) pumping a liquid into said borehole until flow of liquid into said water-bearing formation is established,
(c) thereafter pumping said solution into said formation, and
(d) retaining said solution in said formation for a sufficient time to permit the solution to gel and the gelled resin to cure in place, substantially completely plugging said formation.

References Cited by the Examiner

UNITED STATES PATENTS

| | | | |
|---|---|---|---|
| 2,179,077 | 11/1939 | Riney et al. | 61—40 |
| 3,100,527 | 8/1963 | Hilton et al. | 166—33 |

FOREIGN PATENTS 928,127  6/1963  Great Britain.

JACOB L. NACKENOFF, *Primary Examiner.*

CHARLES E. O'CONNELL, *Examiner.*

T. A. ZALENSKI, S. J. NOVOSAD, *Assistant Examiners.*